United States Patent
Palm

[15] 3,699,212
[45] Oct. 17, 1972

[54] WATER SYSTEMS FOR PHOSPHATE PLANTS

[72] Inventor: Gordon F. Palm, 3503 Cleveland Heights Blvd., Lakeland, Fla. 33803

[22] Filed: Sept. 19, 1968

[21] Appl. No.: 760,775

[52] U.S. Cl. .................423/307, 423/163, 210/42, 423/319
[51] Int. Cl. ....................C01b 25/18, C01b 25/28
[58] Field of Search............23/107, 165, 88, 90, 100; 210/42, 59

[56] References Cited

UNITED STATES PATENTS

| | | |
|---|---|---|
| 2,914,474 | 11/1959 | Hillyer et al. ..................210/53 |
| 3,498,746 | 3/1970 | Smaltz et al. .............23/165 X |
| 3,498,747 | 3/1970 | Smaltz et al. .............23/165 X |
| 1,879,204 | 9/1932 | Guillissen ....................23/107 |
| 1,944,048 | 1/1934 | Walker et al. ................23/165 |
| 3,161,466 | 12/1964 | Fallin............................23/109 |
| 3,485,580 | 12/1969 | Mischel et al. ..............23/107 |
| 3,493,340 | 2/1970 | Bosen et al. ..................23/165 |

FOREIGN PATENTS OR APPLICATIONS

| | | |
|---|---|---|
| 888,085 | 1/1962 | Great Britain...............210/42 |

*Primary Examiner*—Oscar R. Vertiz
*Assistant Examiner*—Gregory A. Heller
*Attorney*—Carl B. Fox, Jr.

[57] ABSTRACT

Systems for use and handling of water in phosphate plants to reduce air and stream pollution, to reduce losses, and to reduce costs. The $pH^+$ of water from scrubbers, condensers, filters, and the like, is adjusted by addition of ammonia for reuse in the plant. Multiple $pH^+$ adjusted water systems may be employed.

12 Claims, 3 Drawing Figures

Gordon F. Palm
INVENTOR.

Gordon F. Palm
INVENTOR.

WATER SYSTEMS FOR PHOSPHATE PLANTS

BACKGROUND OF THE DISCLOSURE

In the operation of phosphate chemical plants producing such end products as wet process phosphoric acid, monoammonium phosphates, diammonium phosphates, NPK (nitrogen, phosphorus, potassium) fertilizers, run-of-pile triplesuperphosphate, granular triplesuperphosphate, or other phosphate compounds, or any combination of these products, and in the storage and shipment of these materials, considerable quantities of phosphoric acid and water soluble phosphatic compounds (hereafter expressed as $P_2O_5$) are lost in the processing, and considerable quantities of fluoride compounds are evolved as gaseous silicon tetrafluoride ($SiF_4$) hereafter referred to as F. In order to prevent air pollution from such plants, it is necessary to use water in various scrubbers, condensers, and the like, to remove the fluoride compounds, together with $P_2O_5$ evolved as dust or as entrained phosphoric acid. It is also necessary to use water to sluice by-product gypsum containing water soluble $P_2O_5$ from the phosphoric acid plant and to wash the plant to remove acid spills and leaks in the plant which are all collected in an acid pond water system.

The collection of these losses, spills, and leaks of $P_2O_5$, together with the removal of $P_2O_5$ from air and gas streams and fluorides scrubbed from gases evolved in the various processing steps, results in an acid pond water with a low pH of about 2.0 which contains phosphoric acid, fluosilicic acid, sulfuric acid, dissolved gypsum, and traces of other compounds. Since the quantities of materials evolved in a large plant resulting in these waters is substantial, the cost of neutralizing all of these waters using conventional methods of lime or limestone has been prohibitive to the economics of the plant operations. In addition, it is not permitted to discharge these acid pond water wastes into local streams since they would result in excessive stream pollution and endanger aquatic life. Therefore, in order to solve the problem of stream pollution, most plants use a system in which these waters are impounded, cooled, and recycled back to the plant for re-use as condenser waters, scrubber waters, sluice waters, and other services as may be required. By recycling this material, the acid pond water accumulates fluoride compounds and phosphatic compounds, and generally reaches a stabilized concentration. Such a system, if properly designed and managed, greatly reduces or eliminates the necessity for neutralizing liquid effluents prior to discharge into surrounding streams.

However, this solution of the possible stream pollution problems and related economics of operation of phosphate chemical and fertilizer plants still presents serious problems with respect to air and stream pollution. The waters discharged to the acid cooling water ponds are warm and evolve gaseous fluorides into the air and thereby contribute to an increase of air-borne fluoride compounds from operations of this type. Serious problems are also encountered due to leakage and seepage of acid pond water from these ponds into surrounding fresh water streams. The acid pond water normally has a low pH, in the range of 2.0, and contains several thousand parts per million of fluorides and phosphoric acid. No successful economical solution to these two problems, i.e., air pollution and stream pollution, concerned in operation of acid water ponds is now in use in the industry.

SUMMARY OF THE INVENTION

This invention provides treatment systems which eliminate air pollution from fluorides evolved from the acid water ponds, and eliminate stream pollution due to leakage or seepage from the acid water ponds. Substantial cost advantages are realized by the operation which partially or wholly compensate for all treatment costs, and in some cases will result in substantial operational savings.

Two general systems are presented, one in which waters of the acid water pond and of the gypsum disposal pond are separately pH-adjusted and then mixed for re-use in the plant, with or without supplementary pH adjustment of the mixed waters, and the other in which the waters of the acid water pond and of the gypsum disposal pond are separately pH-adjusted, at distinct pH levels, and separately re-used in the plant, with or without supplementary pH adjustment of the separate water streams. The latter system is more efficient and permits more nearly ideal uses of the waters and recoveries of the valuable materials contained in the waters. The first system will be referred to hereafter as the mixed water system, and the second system will be referred to hereafter as the separated water system.

DESCRIPTIONS OF THE PREFERRED EMBODIMENTS

Figure 1:
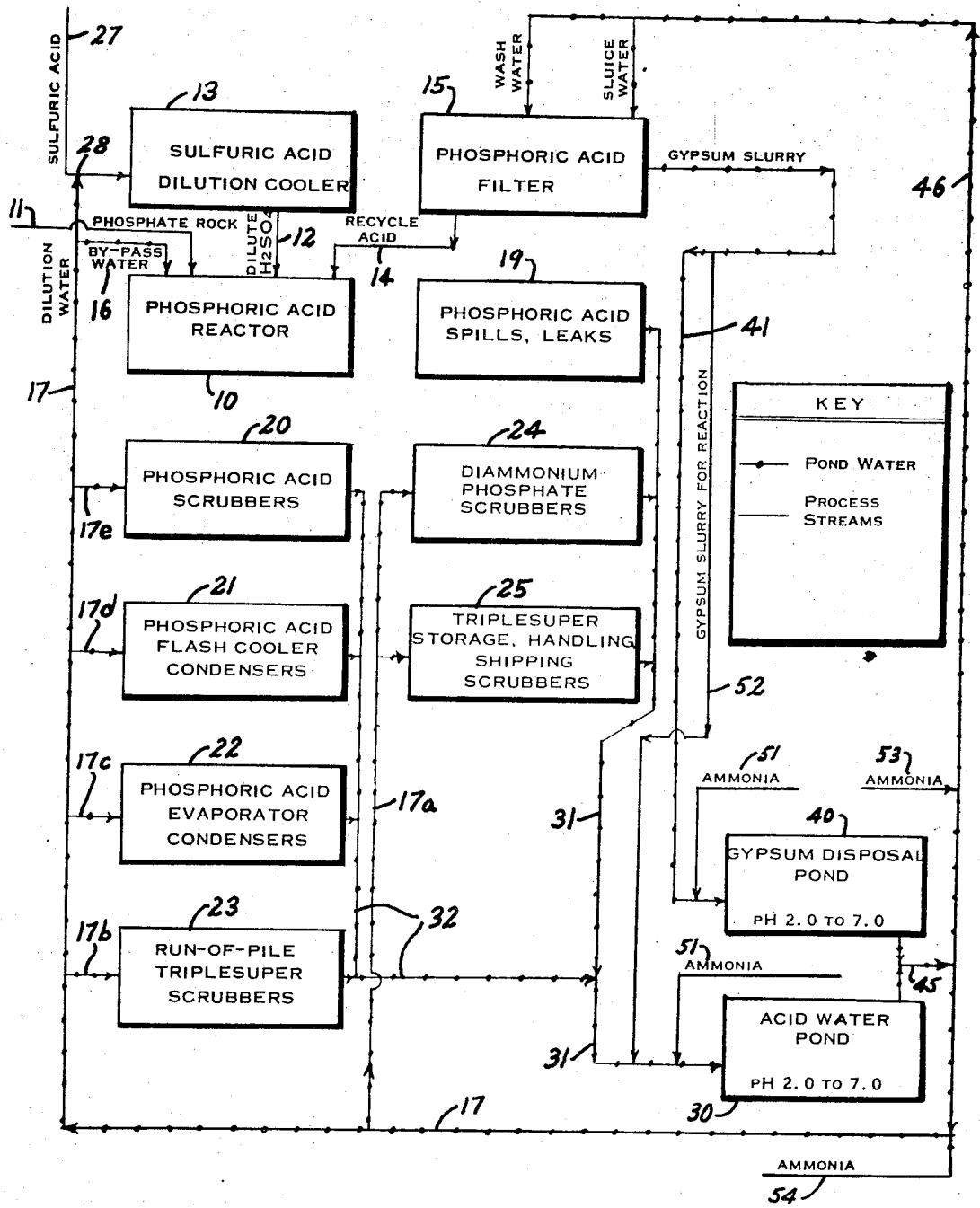
FIG. 1 is a schematic flow sheet of a typical phosphate chemical or fertilizer plant, showing the acid pond water and gypsum pond water systems of the plant, according to the mixed water system embodiment of the invention.

Referring now to the drawings in detail, the preferred embodiments of the invention shown therein will be described.

Mixed Water System

FIG. 1 shows the mixed water system embodiment of the invention in connection with a typical phosphate chemical or fertilizer plant for producing wet process phosphoric acid, diammonium phosphate, and triplesuperphosphate the same general type of system could be applied to plants making other types of phosphate products.

In the schematic showing of FIG. 1 (and also of FIG. 2), all of the material flowlines, and other details not concerning the invention, are omitted. In phosphoric acid reactor 10, phosphate rock introduced at 11 undergoes chemical reaction with dilute sulfuric acid 12 from dilution cooler 13, recycle phosphoric acid 14, from phosphoric acid filter 15 and by-pass water 16 from dilution water line 17 being added to the reaction, as is well known in the art concerning wet process phosphoric acid manufacture. Reactor 10 usually includes a series of reaction tanks through which a body of reaction slurry is circulated. The chemical reaction to produce phosphoric acid, in simplified form, is:

$$Ca_3(PO_4)_2 + 3H_2SO_4 + 6H_2O \rightarrow 2H_3PO_4 + 3(CaSO_4 \cdot 2H_2O).$$

In the reaction, phosphate rock is represented as $Ca_3(PO_4)B2$. In actuality, phosphate rock contains numerous impurities, including $CaF_2$, iron and aluminum salts, and other simple and complex salts which are variable in nature. The $CaSO_4 \cdot 2H_2O$ is, of course, gypsum. The fluoride constituents in the ores are converted to $SiF_4$ (gas) and to various fluosilicates, including $H_2SiF_6$ and other forms.

Phosphoric acid spills and leaks are represented by reference numeral 19 in FIG. 1. Other sources of losses and pollutants, which become dissolved and/or suspended in water, in wet-process phosphoric acid plants are the phosphoric acid scrubbers 20, phosphoric acid flash cooler condensers 21, and phosphoric acid evaporator condensers 22. The forms and locations of these elements of phosphoric acid plants are variable, and are known in the art.

In typical plants of the type described, referred to sometimes as phosphate complexes, plant sections for production of triplesuper phosphate and diamononium phosphate are included, and water carrying phosphate and fluorine compounds picked up by the scrubbers of these plant sections are indicated at 23, 24, and 25.

In the phosphoric acid plant section, the dilution cooler 13 receives concentrated sulfuric acid 27 which is mixed with recycled dilution water from line 17 at 28, the diluted sulfuric acid being cooled at cooler 13 before addition thereof to reactor 10.

Water reaches acid water pond 30 by way of (noded) lines 31, 32, water from sources 19, 24, 25 being delivered to line 31, and water from sources 20, 21, 22, 23 being delivered to line 32.

Water reaches gypsum disposal pond 40 by way of line 41 from filter 15, in the form of a gypsum slurry carrying washed gypsum filtered from the phosphoric acid reaction slurry of reactor 10.

Water from acid water pond 30 and water from gypsum disposal pond 40 are mixed at 45, and returned for use in the plant by way of (noded) lines 46 and 17. The water is mainly used for sluicing the gypsum cake from the phosphoric acid filter and as wash water on the filter, delivered thereto by way of line 46, and as water for the condensers and scrubbers in the phosphoric acid plant, diammonium phosphate plant, triplesuperphosphate plant, triplesuperphosphate storage, handling, and shipping systems, and diammonium phosphate storage, handling, and shipping systems, delivered thereto by way of line 17 and branch lines 17a–17e. The water is also shown used for dilution of $H_2SO_4$ at 28.

The slurry resulting from sluicing the gypsum with recycled water goes to the gypsum disposal pond 40, wherein the gypsum is allowed to settle and the decanted water is mixed at 45 with cool water from the acid water pond 30. The various condenser and scrubber waters from the plant all discharge to the acid water pond for cooling. The combined water streams are then recycled to the plant for subsequent re-use as described before. Many variations of this system including internal plant re-use of the acid pond water are practiced by those skilled in the art of design or operation of phosphate chemical and fertilizer plants.

According to the invention, the acid pond water and the gypsum pond water is treated by partially or completely neutralizing it with liquid or gaseous ammonia or with ammonia solutions, or any combination thereof, either with or without the addition of a calcium salt or salts, preferably gypsum. The salts may be added as dry materials, as wet materials, as slurries, or any combination thereof.

FIG. 1 shows schematically one method for treating the gypsum pond water in order to neutralize or partially neutralize the constituents in the pond. To the gypsum slurry going to the gypsum disposal pond 40 through line 41, ammonia is added at 51 and in the presence of the excess gypsum present, the following reaction as shown in equation 1 occurs (water of hydration of the gypsum omitted):

$$H_2SiF_6 + 3CaSO_4 + 6NH_3 + 2H_2O \rightarrow SiO_2 + 3(NH_4)_2SO_4 + 3CaF_2 \quad (1).$$

Calcium fluoride is precipitated with the maximum precipitation occurring in a pH range of 2.0 to 7.0, or higher, and preferably at about pH = 4.0. A reaction also occurs between ammonia and the phosphoric acid present as shown in equation 2:

$$H_3PO_4 + NH_3 \rightarrow NH_4H_2PO_4 \quad (2);$$

and, at pH above 4.5, the reaction as shown in equation 3 occurs:

$$NH_4H_2PO_4 + NH_3 \rightarrow (NH_4)_2HPO_4 \quad (3);$$

and also, with traces of sulfuric acid present, a reaction occurs as shown in equation 4:

$$H_2SO_4 + 2NH_3 \rightarrow (NH_4)_2SO_4 \quad (4).$$

A side reaction also occurs with the phosphoric acid and ammonia in the presence of excess gypsum causing some of the phosphate to precipitate as dicalcium phosphate, as shown in equation 5:

$$H_3PO_4 + CaSO_4 + 2NH_3 + 2H_2O \rightarrow CaHPO_4 \cdot 2H_2O + (NH_4)_2SO_4 \quad (5).$$

By this method, the neutralized or partially neutralized water from the gypsum pond is reduced in fluoride content to approximately 40 ppm F or less, and is reduced in $P_2O_5$ content by precipitation of dicalcium phosphate.

The water going to the acid water pond 30 can also be neutralized or partially neutralized with ammonia to raise the pH from 2.0 to 7.0 or higher (preferably in the range of a pH of about 4.0) by the same reactions as shown above in equations (1)–(5). However, the dissolved gypsum in the acid water passing to the acid water cooling pond 30 is usually not sufficiently high in dissolved gypsum to supply all the gypsum needed by the reaction of equation 1. Therefore, it may be necessary to add a small amount of gypsum to this stream during reaction with ammonia in order to effectively precipitate the fluorides as calcium fluoride. This may easily be accomplished by diverting part of the gypsum slurry from the phosphoric acid plant into this stream, by way of a line 52 connecting between lines 41, 31 prior to reaction with ammonia, or by other means of gypsum or other calcium salt addition.

Water discharging from the ponds may or may not be reacted with additional ammonia at 53 and/or 54 to raise the pH before recycle back to the plant for re-use.

By means of the system described, it is possible to raise the pH in the waters inside the acid water pond 30 and the gypsum disposal pond 40 so that seepage or leakage or low pH water containing considerable quantities of phosphoric acid and fluorides from these ponds does not create a problem with regard to stream pollution. It is also possible by means of the treatment described above to reduce the soluble fluoride content to such a level in the water present in the ponds as to effectively eliminate air pollution due to gaseous fluorides evolved from these sources.

Other advantages are realized by the neutralization or partial neutralization of the acid pond water. A portion of the treated water recirculated to the plant through lines 46 and 17 is used to wash the gypsum cake on the phosphoric acid filter 15, and may or may not be used as dilution water for sulfuric acid dilution at 28. By these means the make-up water for the phosphoric acid reaction system is supplied and several advantages are realized:

1. $P_2O_5$ still remaining in the treated water enters the phosphoric acid system in the make-up water and results in a $P_2O_5$ recovery. This is commonly practiced at the present time with acid pond water, which has not been treated, in order to increase $P_2O_5$ recovery.

2. An additional advantage occurs when acid pond water is neutralized or partially neutralized with ammonia in that the ammonium sulfate such as generated by reactions 1, 4, and 5, which is water soluble and subsequently is in the make-up water to the phosphoric acid plant, also enters into the phosphoric acid process. Ammonium sulfate is an acid salt and will react with the phosphate rock present according to reaction (6) to produce phosphoric acid and ammonium phosphate in solution and precipitate gypsum, thereby reducing the amount of sulfuric acid required in the process:

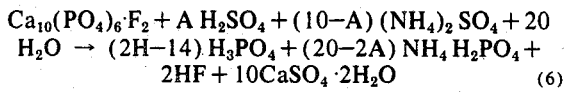

$$Ca_{10}(PO_4)_6 \cdot F_2 + A\, H_2SO_4 + (10-A)(NH_4)_2SO_4 + 20 H_2O \rightarrow (2H-14) H_3PO_4 + (20-2A) NH_4H_2PO_4 + 2HF + 10CaSO_4 \cdot 2H_2O \qquad (6)$$

Where $8 \leq A \leq 10$.

3. Another economy realized by treatment of pond water with ammonia occurs in plants producing fertilizers containing ammonium phosphate. Since all or part of the phosphoric acid produced in the phosphoric acid plant will be subsequently neutralized with ammonia to produce fertilizer containing ammonium phosphate, the ammonia already present in the acid by reaction of a portion of the $P_2O_5$ by treating the acid pond water with ammonia, which is used as make-up water to the phosphoric acid plant, becomes available as ammonia in the final product. A substantial portion of the ammonia used for treatment of the acid pond water can then be recovered as a saleable product, thereby greatly decreasing the cost of acid pond water treatment.

Separated Water System

Figure 2:
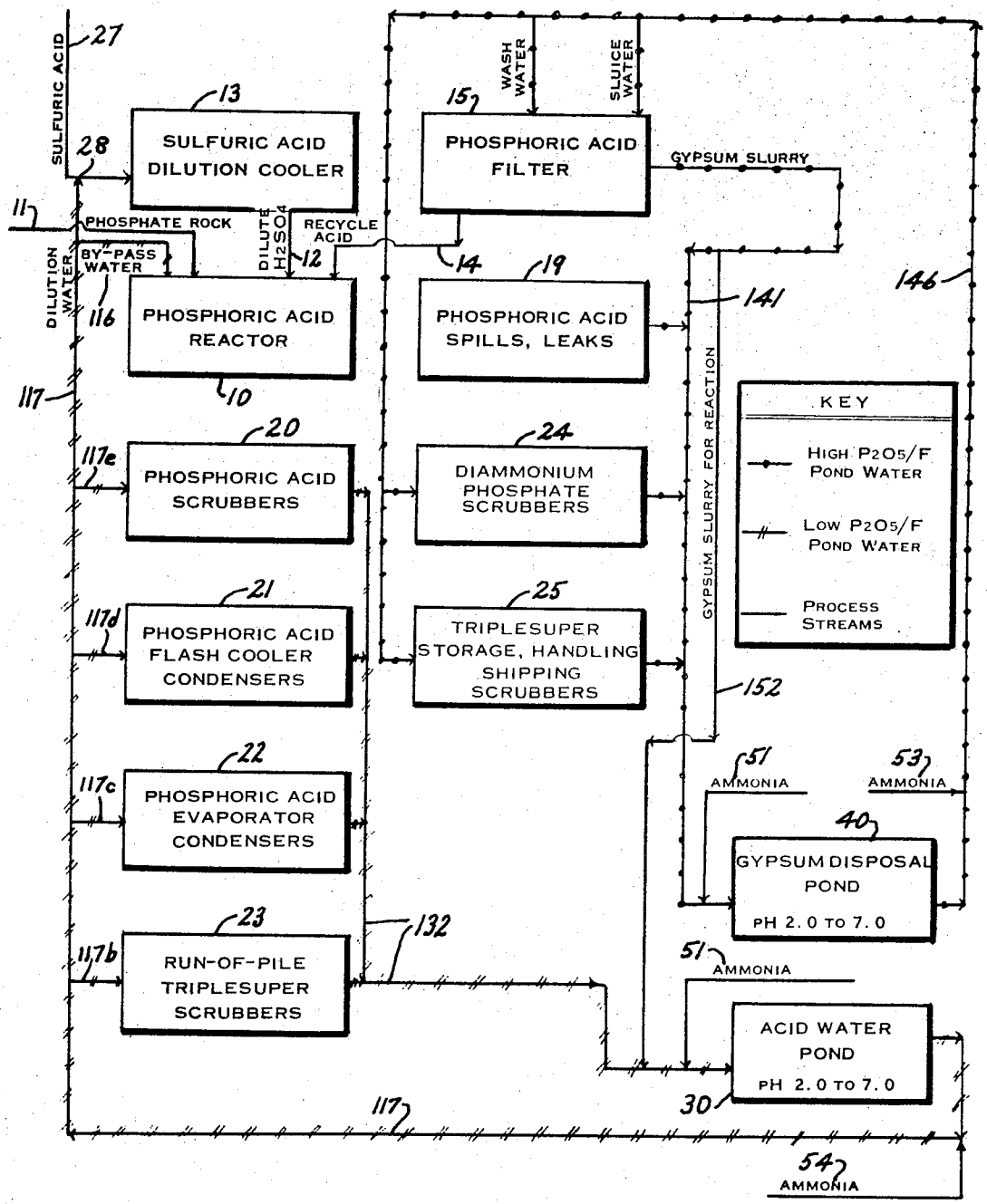
FIG. 2 is a schematic flow sheet of the typical phosphate chemical or fertilizer plant shown in FIG. 1, showing the acid pond water and gypsum pond water systems of the plant, according to the separated water system embodiment of the invention.

A modification of the above system, which has even greater advantages, is accomplished by separating the water streams from the plant into those which have a high $P_2O_5/F$ ratio and those which have a low $P_2O_5/F$ ratio, as shown in FIG. 2, which is similar to FIG. 1 except that the water from the plant is separated into the two described separate systems.

The plant units represented by the numbered boxes in FIG. 1 are the same in FIG. 2 and are designated by the same reference numerals as are employed in FIG. 1. The same reference numerals are also employed in FIG. 2 for the acid flows at dilution cooler 13. The water discharged from acid water pond 30 flows by way of (double-slashed) line 117 and branch lines 117B – 117e and 116 to the destinations before described in connection with line 17 and branch lines 17b – 17e and 16.

Water is delivered to acid water pond 30 from the same plant units as before, through line 132.

The water discharged from gypsum disposal pond 40 is not mixed with the water discharged from acid water pond 30, and is delivered by way of (noded) line 146 to filter 15, and also, to scrubbers 24 and 25, as shown in FIG. 2.

Water enters pond 40 by way of line 141 from filter 15, from phosphoric acid spills and leaks 19, and from scrubbers 24 and 25. Gypsum slurry may be delivered from line 141 to line 132 by way of line 152 in order to provide for addition of calcium salts to pond 30 as required.

The water streams are neutralized by ammonia addition at 51–54, as before.

The $P_2O_5/F$ ratios at the two ponds 30, 40 are at different levels. The water of gypsum disposal pond 40 has a higher $P_2O_5/F$ ratio than does the water of acid water pond 40.

An advantage occurs when the high $P_2O_5/F$ water stream from the gypsum pond is used as wash water on the filter, as its use results in higher $P_2O_5$ recoveries in the phosphoric acid plant. The treated (neutralized) water from the acid water pond, with a low $P_2O_5/F$ ratio, is low in $P_2O_5$ but relatively high in soluble ammonium sulfate. This stream can be used to dilute the sulfuric acid if a dilution cooler is used in the plant, or if a sulfuric acid dilution cooler is not used, the treated water from the acid water pond can be bypassed around the filter into the phosphoric acid reactor 10. In either case, a return of ammonium sulfate for reaction with the phosphate rock as previously described occurs (Equation 6).

In order to demonstrate the relative difference and importance of running separated high $P_2O_5/F$ ratio and low $P_2O_5/F$ ratio waters in the plant, a typical example is given for a phosphate chemical or fertilizer operation. In this example, the plant produces the following intermediate and/or final products:

a. 100,000 tons per year (TPY) of $P_2O_5$ as 30 percent $P_2O_5$ acid with evaporation of 76,500 TPY to 54 percent $P_2O_5$ acid and 17,000 TPY $P_2O_5$ evaporated to 72 percent $P_2O_5$.

b. Diammonium phosphate (DAP) using 47,000 TPY acid $P_2O_5$ to produce 100,000 TPY DAP.

c. Run-of-pile triple superphosphate (TSP) using 36,000 TPY acid $P_2O_5$ to produce 100,000 TPY 48 percent $P_2O_5$ product run-of-pile TSP (12,000 TPY rock $P_2O_5$ used)

Most of the $P_2O_5$ losses are recovered in the acid pond water, and fluoride gases are evolved mainly as $SiF_4$, with some HF, and are recovered in the acid pond water by means of the scrubbers and condensers. The product tonnages shown above are uncorrected for losses but such correction has a negligible influence in describing the principles involved.

In separating the streams in the plant, the sources comprising the high $P_2O_5/F$ pond water streams are shown in Table 1. The streams which are high in $P_2O_5$ and low in F are those containing the gypsum cake from the filter 15; phosphoric acid spills and leaks 19; material removed by scrubbers 24 in DAP manufacturing, handling, and shipping; and material removed by scrubbers 25 in ROP-TSP handling and shipping. The water from these systems has a $P_2O_5/F$ ratio of about 23.8, with a ratio range of 3.1 to 152.0.

Those streams which have a low $P_2O_5/F$ ratio; that is, relatively low in $P_2O_5$ but high in F, are those resulting from scrubbing of the phosphoric acid reaction gases; condensation of steam from the evaporators; and from scrubbing of gases in run-of-pile triple superphosphate manufacture, as summarized in Table 2. The combined waters from these operations result in a typical $P_2O_5/F$ ratio of about 0.128, with a ratio range of 0.031 to 1.37.

A comparison of the two separate water systems with a single or composite acid pond water system, that results if these two streams are mixed together, is shown in Table 3. It is seen that the composite system has a $P_2O_5/F$ ratio of 0.73 and a range of 0.12 to 5.0. Comparing the $P_2O_5/F$ ratio obtained in the gypsum pond water (or the high $P_2O_5/F$ stream) which occurs when separate acid pond water streams are used in the plant with a composite stream where all the acid pond waters from the plant are mixed, it is found that the $P_2O_5/F$ ratio in the separate gypsum pond water stream has a value of from 26 to 32 times higher than the composite stream. This high ratio shows the excellent advantage for separate streams in that the stream to the filter as wash water contains a much higher tonnage of $P_2O_5$ for recovery than if the water streams from the plant were combined.

TABLE 1.—HIGH $P_2O_5/F$ POND WATER CONTAMINANT SOURCE

| | Loss of water soluble $P_2O_5$ | | Gaseous fluorides | | $P_2O_5/F$ ratio (wt.) actual (range) |
| --- | --- | --- | --- | --- | --- |
| | Percent, actual (range)[1] | TPY, actual (range) | Units (wt.) actual (range) | TYP, actual (range) | |
| 1. Gypsum cake from filter 15 | 1.0 (0.2-3.0) | 1,000 (200-3,000) | [2] 0.08 (0.04-0.12) | 80 (40-120) | 12.5 (1.7-75) |
| 2. Spills, leaks storage areas, centrifuge operation, etc. 19 | 2.0 (0.5-5.0) | 2,000 (500-5,000) | [3] 0.05 (0.2-0.12) | 100 (40-240) | 20.0 (2.1-125) |
| 3. DAP manufacturing, handling, shipping 24 | 3.0 (1.0-5.0) | 1,410 (470-2,350) | [4] 0.5 (0.2-2.0) | 25 (4-100) | 56.5 (4.7-590) |
| 4. ROP-TSP handling, reclaim, etc. 25 | 1.0 (0.5-5.0) | 480 (240-2,400) | Negl. | Negl. | |
| Total | | 4,890 (1,410-12,750) | | 205 (84-460) | 23.8 (3.1-152) |

[1] Percent of $P_2O_5$ input.
[2] Ratio of F to acid $P_2O_5$ in cake (wt.).
[3] Ratio of F to acid $P_2O_5$ (wt.).
[4] Lb./ton DAP manufacturing.

TABLE 2.—LOW $P_2O_5/F$ POND WATER CONTAMINANT SOURCE

| | Loss of water soluble $P_2O_5$ | | Gaseous fluorides | | |
| --- | --- | --- | --- | --- | --- |
| Contaminant source | Percent, actual (range)[1] | TPY, actual (range) | Units (wt.), actual (range) | TPY, actual (range) | $P_2O_5/F$ ratio (wt.), actual (range) |
| 1 Phosphoric acid reaction 10 and scrubber 20 | 0.2 (0.1—1.0) | 200 (100—1,000) | [2] 30 (10-90) | 1,500 (500-4,500) | 0.133 |
| 2 Evaporation to 54% $P_2O_5$ 22 | 0.5 (0.2—3) | 383 (153—2,300) | [2] 100 (50-150) | 5,000 (2,500-7,500) | 0.076 |
| 3 Evaporation to 72% $P_2O_5$ 22 | 0.5 (0.2—2.0) | 85 (34—340) | [2] 10 (5-30) | 500 (250-1,500) | 0.170 |
| 4 Run-of-pile TSP mfg. 23 | 1.0 (0.5—3.0) | 360 (180—1,080) | [3] 20 (5-30) | 1,000 (200-1,500) | 0.360 |
| Total | | 1,028 (467—4,720) | | 8,000 (3,450-15,000) | 0.128 (0.031-1.37) |

[1] Percent of $P_2O_5$ input.
[2] Lb./ton $P_2O_5$ produced as 30% $P_2O_5$ acid.
[3] Lb./ton triple.

TABLE E.—3 COMPOSITE SYSTEM COMPARISON

| Pond water | TPY $P_2O_5$, actual (range) | TPY F, actual (range) | $P_2O_5/F$ ratio (wt.) actual, (range) |
| --- | --- | --- | --- |
| High $P_2O_5/F$ (gypsum disposal pond 40) | 4,890 (1,410-12,750) | 205 (84-460) | 23.8 (3.1-152) |
| Low $P_2O_5/F$ (acid water pond 30) | 1,028 (467-4,720) | 8,000 (3,450-15,000) | 0.128 (0.031-1.37) |
| Composite | 5,918 (1,877-17,470) | 8,205 (3,534-15,460) | 0.73 (0.12-5.0) |

The following conclusions may be drawn from the above results: (1) the separated pond system (FIG. 2) yields an advantage of $P_2O_5$ recovery of 32/1 over the system (FIG. 1) wherein the pond waters are mixed, since the gypsum disposal pond 40 water used to wash filter 15 has a $P_2O_5/F$ ratio of 23.8 and the composite or mixed pond waters have a $P_2O_5/F$ ratio of 0.73; at the lower pond concentration ranges (good plant recovery of $P_2O_5$) the above advantage is 26/1 (gypsum disposal pond 40 water, $P_2O_5/F = 3.1$; composite water, $P_2O_5$ ratio = 0.12; 3.1/0.12 = 26.1); at the higher pond concentration ranges (poor plant recovery of $P_2O_5$), the above advantage is 30/1 (gypsum disposal pond 40 water, $P_2O_5/F = 152$; composite (mixed) pond waters, $P_2O_5$ ratio = 5.0; 152/5.0 = 30/1).

Description of Neutralization System

Figure 3:
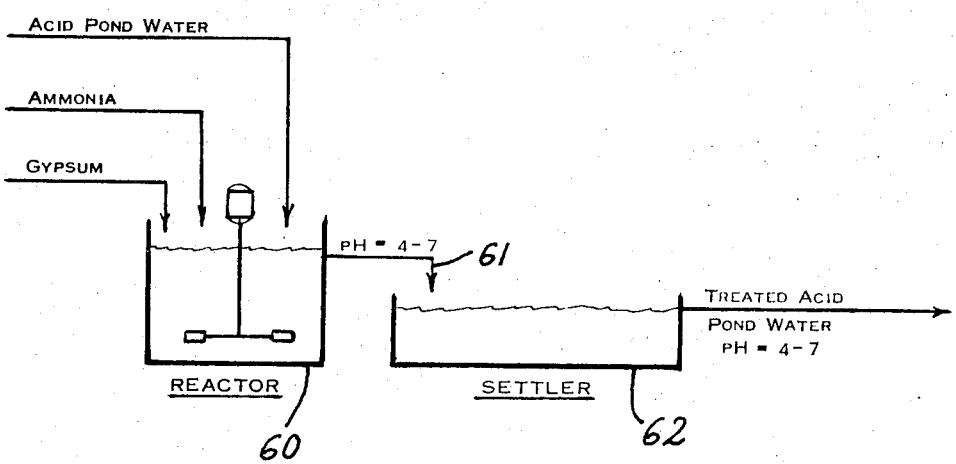
FIG. 3 is a schematic flow sheet showing a system for neutralization of acid pond water, and which is applicable also for neutralization of gypsum pond water, and mixed waters, in connection with the systems shown in FIGS. 1 and 2.

A preferred system for the neutralization of acid pond water with ammonia is as shown schematically in FIG. 3. Other systems will be readily self-evident to those skilled in the art and experienced in fertilizer plant operations. The acid pond water to be introduced to or flowed from pond 30 (at 52 and/or 54) is mixed with ammonia and gypsum, in an agitated tank or reactor 60, so as to provide good contact of all the components for good reaction. The reacted mixture overflows the reactor 60 at 61 into a settler 62 in which the solids formed in the reaction are allowed to settle. The solids consist mainly of calcium fluorides, silica, dicalcium phosphate, and unreacted gypsum. The clear overflow from the settler, which is the treated acid pond water, has a pH in the range 2.0 to 7.0, depending upon the amount of ammonia used in the reactor. This treated water is then recirculated back to the plant for re-use in the scrubbers, condensers, etc., and then returned. Several variations of the system shown are possible. The reactor 60 could be a reactor of pipeline form in which turbulence causes mixture of the components, or the reactor could consist of turbulence in a sewer or ditch to cause mixing of the components, or other systems that might be devised which would result in mixing of the reactants to obtain the desired end results. The settler 62 could be a conventional thickener, a tank, or an earthen bottomed pond with earthen dikes, a plastic lined pond, or other means which could be devised to allow the precipitated solids to settle and a clear acid pond water obtained. It is not absolutely necessary that the acid pond water be completely clear of suspended solids for re-use in the plant, but sufficient settling should be provided so that excessive accumulation of solids in the overflow liquor does not occur so as to cause operating problems in the plant. A turbid or cloudy treated acid pond water, or one containing a small amount of suspended solids, would be just as suitable for re-use in the plant as a completely clean and crystal-clear solution, so that the actual condition of the treated acid pond water with respect to solid content is not critical to this invention so long as most of the solids precipitated by the reactions are removed. Variations of the system shown could also include the addition of other calcium salts than gypsum in order to precipitate the fluorides present as calcium fluoride, or by the addition of no calcium salts, to result in only partial precipitation in the fluorides; the amount of ammonia added could be varied to allow the pH to range from the normal pH of untreated water from about 2.0 to a pH of 7.0, or higher, and the amount of ammonia used and the amount of calcium salts or type of calcium salts used could be varied in an infinite number of ways to obtain different results from the system without actually changing the basic concept and intent of the invention with regard to the treatment and re-use of the waters.

Example

The following example of the treatment of acid pond water with ammonia to accomplish the reactions described and to realize the advantages claimed is described as follows:

1,000 ml. of acid pond water at ambient temperature and at a pH of 1.8 containing 2,000 ppm of $P_2O_5$, 2,900 ppm of F, 1,400 ppm of CaO, and 2,760 ppm of $SO_4$, were reacted with ammonia to a pH of 4.0 in the presence of 10 grams of calcium sulfate ($CaSO_4 \cdot 2H_2O$) which was added to the solution with mixing to insure intimate contact. The precipitate formed was allowed to settle and the clear liquor was analyzed. The clear liquor, at pH 4.0, contained only 40 ppm F (98.5 percent removal), 1,250 ppm $P_2O_5$ (37.5 percent removal), 700 ppm CaO (50 percent removal), 9,200 ppm $SO_4$ (333 percent increase), and 2,290 ppm $NH_3$. Similar results are obtained with neutralization to other pH values with the fluoride content being higher at lower pH values and the amount of $P_2O_5$ precipitated being lower at lower pH values and higher at higher pH values. Different results also occur with no addition of gypsum or with varying additions of gypsum, as well as with the using of different pH values, but these procedures do not depart from the intent or spirit of the invention.

It will be understood that the plant layouts as shown in the drawings are schematic, and that the layout for a particular plant may differ considerably, even though carrying out essentially the same process. Processing units of a plant may be duplicated, or be in plural units, and units may be combined. Where a flowline is shown on the drawing, it may represent plural flowlines for the described purpose.

By appropriate modifications which will be apparent to those skilled in the art, the systems of this invention may be applied to plants for DAP and/or triple superphosphate or other phosphate chemical manufacture, where the phosphoric acid is transported to the plant from a separate source. The waters are derived from, treated, and re-used as has been described, with the absent plant unit or units and connecting flowlines simply omitted. Such plant may include manufacture of feed grade calcium phosphates, which are closely akin to superphosphate plants and wherein fluorine materials are driven off by calcining operations, and recovered by water scrubbing.

While preferred embodiments of the invention have been shown in the drawings and described, many modifications thereof may be made by a person skilled in the art without departing from the spirit of the invention, and it is intended to protect by Letters Patent all forms of the invention falling within the scope of the following claim.

I claim:

1. In a process for manufacture of wet process phosphoric acid, wherein acid-containing waters are available for re-use in the process, said waters containing varying amounts of $H_3PO_4$, $H_2SO_4$, HF, $H_2SiF_6$, and $SiF_4$ in solution, and dissolved gypsum, and having a pH in the acidic range as low as about 1.5; the improved water re-use process comprising adding ammonia and calcium sulfate to said waters whereby, in the presence of said dissolved gypsum present in said waters and said calcium sulfate added to said waters, the volatile fluorine compounds are precipitated as salts of calcium and fluorine and thereby are rendered non-volatile thereby reducing air pollution from the process, said ammonia reacting to form ammonium sulfate dissolved in said waters, and separating said precipitated salts from said waters and re-using said waters in the process and recovering said dissolved ammonium sulfate.

2. The process of claim 1 wherein the pH of said waters is increased by said ammonia and calcium sulfate addition from the initial pH to any pH up to a pH of about 9.0.

3. The process of claim 1 wherein the pH of said waters is increased by said ammonia and calcium sulfate addition from the initial pH to a pH in the range 4.0 to 5.0.

4. The process of claim 1, wherein waters derived from scrubbers, condensers, and spill and leak washing are delivered from the process to separate pond means and the remainder of said waters are delivered to gypsum disposal pond means, and the waters from each said pond means are re-used in the process as described after ammonia and calcium sulfate treatment thereof.

5. The process of claim 4, wherein said waters from said separate and gypsum disposal pond means are mixed for re-use in the process.

6. The process of claim 4, wherein said waters from said separate and gypsum disposal pond means are separately re-used in the process.

7. The process according to claim 6, wherein the weight ratio, $P_2O_5/F$, of said gypsum disposal pond means water is in the range, 2 to 200; and wherein the weight ration, $P_2O_5/F$, of said other pond means water is in the range, 0.02 to 1.5.

8. The process of claim 4, wherein ammonia and calcium sulfate are added to said waters prior to introduction to said separate pond means.

9. The process of claim 4, wherein said waters are ammoniated prior to introduction to said separate pond means and are further ammoniated after withdrawal from said separate pond means for re-use.

10. The process of claim 4, wherein only the waters of said separate pond means are ammoniated.

11. The process of claim 1, wherein said process includes facilities for manufacture of at least one of diammonium phosphate and triple superphosphate having effluent scrubber waters containing acidic fluorine and phosphate materials, said waters being combined with the aforenamed waters and ammonia and calcium sulfate added therewith for re-use as described.

12. The process of claim 4, wherein said process includes facilities for manufacture of at least one of fertilizer containing ammonium phosphate and triple superphosphate and having effluent scrubber waters containing fluorine and phosphate materials, said waters being combined with the aforenamed waters delivered to said separate pond means and said ammonia and calcium sulfate added therewith for re-use as described.

* * * * *